United States Patent
Stucker

(10) Patent No.: US 10,658,087 B2
(45) Date of Patent: May 19, 2020

(54) DETECTION APPARATUS AND METHOD OF DETECTING THE NEUTRON ABSORPTION CAPABILITY OF A CONTROL ELEMENT OF A NUCLEAR INSTALLATION

(71) Applicant: WESTINGHOUSE ELECTRIC COMPANY LLC, Cranberry Township, PA (US)

(72) Inventor: David L. Stucker, Chapin, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 16/386,756

(22) Filed: Apr. 17, 2019

(65) Prior Publication Data

US 2019/0244720 A1   Aug. 8, 2019

Related U.S. Application Data

(63) Continuation of application No. 15/677,098, filed on Aug. 15, 2017, now Pat. No. 10,446,281.

(51) Int. Cl.
| | |
|---|---|
| *G21C 7/08* | (2006.01) |
| *G21C 17/104* | (2006.01) |
| *B25J 9/16* | (2006.01) |
| *G21C 17/10* | (2006.01) |
| *G21C 19/20* | (2006.01) |

(52) U.S. Cl.
CPC .......... *G21C 17/104* (2013.01); *B25J 9/1684* (2013.01); *G21C 17/10* (2013.01); *G21C 19/207* (2013.01); *G21C 7/08* (2013.01); *Y10S 901/44* (2013.01)

(58) Field of Classification Search
CPC ........ B25J 9/1684; G21C 17/104; G21C 7/08; Y10S 901/44; G01N 23/09; G01T 3/00
See application file for complete search history.

(56) References Cited

U.S. PATENT DOCUMENTS

| | | | | |
|---|---|---|---|---|
| 4,172,760 A | * | 10/1979 | Ballard ................ | G21C 17/06 376/245 |
| 2013/0264486 A1 | * | 10/2013 | Bingham .............. | G01N 23/05 250/390.02 |

* cited by examiner

*Primary Examiner* — Marcus H Taningco
(74) *Attorney, Agent, or Firm* — K&L Gates LLP

(57) ABSTRACT

A detection apparatus is usable to detect the neutron absorption capability of a control element of a nuclear installation and includes a neutron radiograph apparatus and a robot apparatus. The neutron radiograph apparatus includes a neutron emission source of variable strength, a detector array, a mask apparatus and a positioning robot all under the control of a central processor and data acquisition unit. The neutron emission source is advantageously switchable between an ON state and OFF state with variable source strength in the ON state, which avoids any need for shielding beyond placing the neutron emission source in an inspection pool at the nuclear plant site including but not limited to the spent fuel or shipping cask laydown pools. The neutron emission source is situated at one side of a wing of the control element and generates a neutron stream, the detector array is situated on an opposite side of a wing, and the neutron emission source and detector array are robotically advanced along the wing. The detector array is monitored in real time, and various masks of the mask apparatus can be positioned between the neutron emission source and the detector array to more specifically identify the position on the blade where the neutrons are passing through.

20 Claims, 7 Drawing Sheets

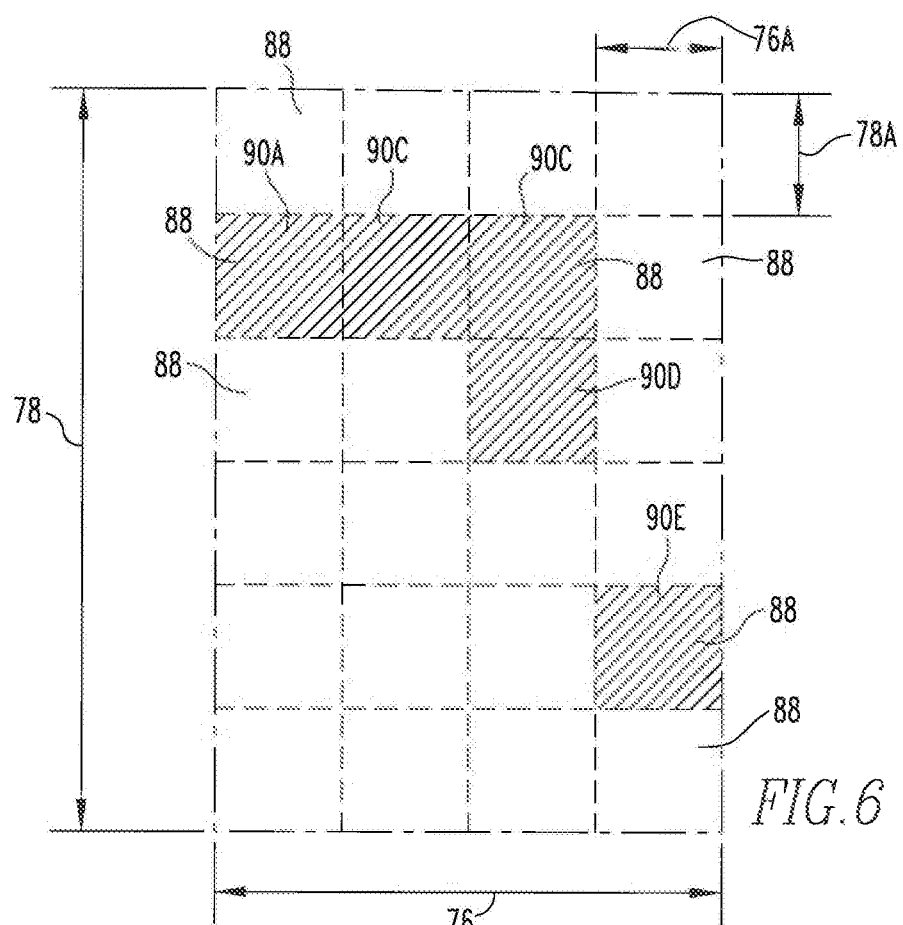
FIG. 6
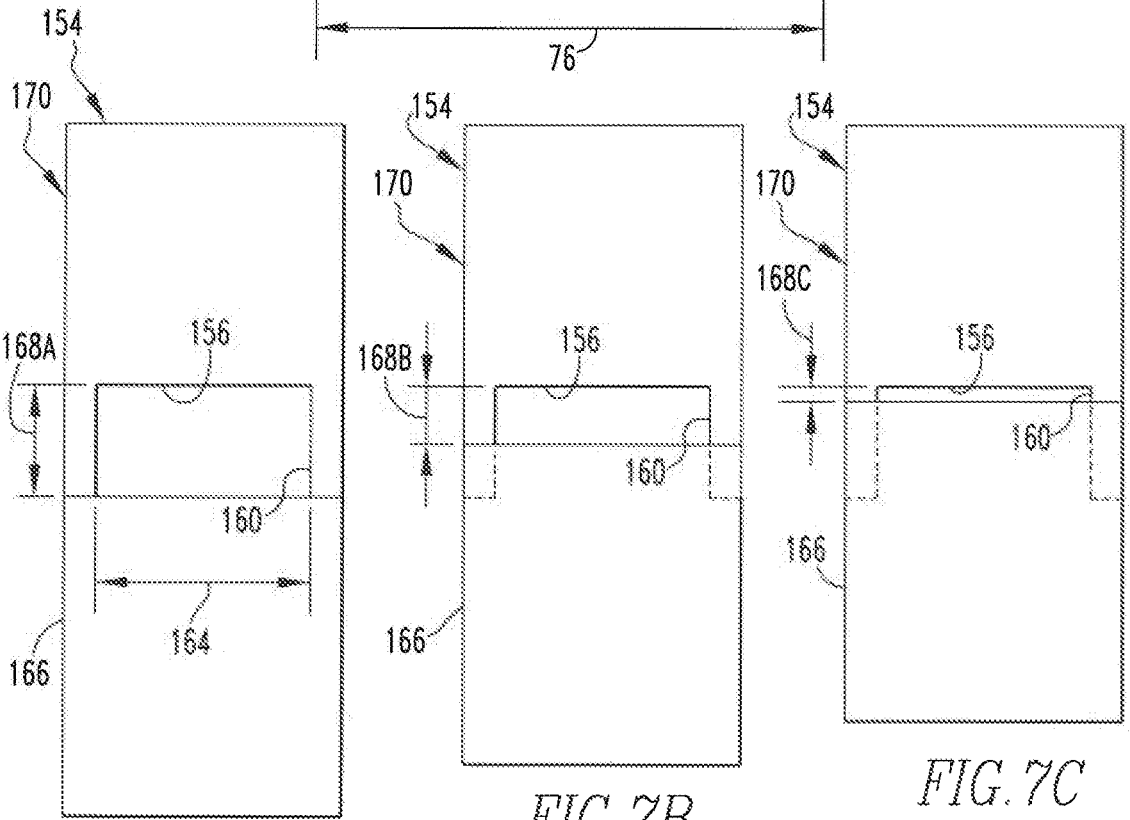
FIG. 7A
FIG. 7B
FIG. 7C

DETECTION APPARATUS AND METHOD OF DETECTING THE NEUTRON ABSORPTION CAPABILITY OF A CONTROL ELEMENT OF A NUCLEAR INSTALLATION

CROSS REFERENCE TO RELATED APPLICATION

The instant application claims priority from U.S. patent application Ser. No. 15/677,098 filed Aug. 15, 2017, the disclosures of which are incorporated herein by reference.

BACKGROUND

1. Field

The disclosed and claimed concept relates generally to nuclear power generation equipment and, more particularly, to a detection apparatus and a method of use that are intended to evaluate the neutron absorption capability of control elements of BWR and PWR nuclear reactors.

2. Related Art

Various types of nuclear power generation systems are known to exist and are particularly known to include boiling water reactors (BWRs) and pressurized water reactors (PWRs). A BWR includes, among other components, a number of blades that are used as control elements that absorb neutrons and control the nuclear reaction within a reactor of a nuclear installation. As employed herein, the expression "a number of" and variations thereof shall refer broadly to any non-zero quantity, including a quantity of one. One such blade is depicted in an exemplary fashion in FIG. 1 at the numeral 6.

Such blades and are configured to be of an elongated cruciform shape having a hub and four wings that protrude from the hub. The wings are structured to each be received between adjacent pairs of fuel assemblies to absorb neutrons in the water within which the fuel assemblies are situated. During normal operation of the BWR, the a substantial fraction of the blades typically are at least partially withdrawn from being situated between the fuel assemblies and can be, as needed, advanced further into a position situated between the adjacent pairs of fuel assemblies. The balance of the blades will be positioned partially to fully withdrawn as determined by the core reactivity management requirements as a function of the core depletion with exposure and the reactor thermal margin requirements. Such further insertion of the blades causes the blades into the reactor fuel region results in absorbing a greater number of neutrons, thereby slowing or controlling the nuclear reaction in a known fashion.

The BWR control blades each include a plurality of elongated hollow passages that are filled with boron or other neutron absorbing substance and are capped. In one such type of blade design, the passages are oriented substantially perpendicular to the longitudinal extent of the hub and are formed by drilling holes in the edges of the wings. The holes are formed with boron or another neutron absorbing substance and are capped. In another such blade design, the blades are formed by providing elongated hollow tubes that each have an elongated passage that is filled with boron or another neutron absorbing and that is then capped at the ends, and then the tubes are laid side-by side and affixed together in any of a variety of fashions such as by covering the tubes with a sheet of metal to form the elongated cruciform shape.

Over time, the passages in the blades that contain the boron or other neutron absorbing substance can develop defects in any of a variety of fashions. Such a defect will then allow the highly pressurized cooling water for the reactor into the space reserved for the absorbing material. The water intrusion into the neutron absorbing substance generally has the effect of washing away the absorbing material within the defective absorber tube, thereby leaving a region within the control bade partially or completely devoid of a neutron absorbing substance. The consequence is that the blade in the vicinity of such a breached passage does not absorb neutrons as required. This loss of absorption becomes significant from a safety and operational perspective when the defective portion of the control blade is large enough to either diminished the overall ability of the plurality of control blade insertions to extinguish the nuclear chain reaction within the reactor or results in unacceptable reactor power distributions and resulting loss of thermal margin.

Over time, any given blade can have one or more locations thereon where the neutron absorbing substance is lacking due to such a defect, at which locations the blade does not absorb neutrons, and rather allows neutrons to pass directly therethrough. While a certain number of zones and/or a certain distribution of zones where neutrons pass directly through the blade can be deemed acceptable, the overall ability of the blade to absorb neutrons and to slow or otherwise control a nuclear reaction must not be compromised. As such, blades must be non-destructively examined once there are either visual or operational defect indications to assess their continued ability to effectively absorb neutrons and thereby meet the design and safety requirements.

In one such prior inspection methodology, a neutron absorbing film is applied on one side of a wing and a neutron source is applied at the opposite side of the wing. Neutrons that are not absorbed and that rather pass through the wing at any given location thereon leave a telltale indication on the film at that location. A neutron source that has been used in such procedures employs californium 252, which is a neutron source that constantly emits neutrons and thus requires special shielding during transport and during certain portions of its use during an inspection procedure. After extensive exposure of the blades to the neutrons from the neutron source, the film would then be removed and examined, much in the way of X-ray film, for regions that include the telltale indication where neutrons had passed through the wing. The neutron absorption capability of the wing is then evaluated based upon an evaluation of the film. The use of such film has been cumbersome for a number of reasons, including the extended time frame to achieve meaningful film exposure that is required to quantify the blade effectiveness, the special shielding of the californium 252 neutron source that is required, and the extensive time that transpires between initiating the procedure and obtaining the results of the procedure. Improvements would thus be desirable.

SUMMARY

An improved detection apparatus is usable to detect the neutron absorption capability of a control element of a nuclear installation and includes a neutron radiograph apparatus and a robot apparatus. The neutron radiograph apparatus includes an neutron emission source, a detector array, and a mask apparatus. The neutron emission source is advantageously switchable between an ON state and OFF state and employs an accelerator that emits a deuterium particle at either another deuterium particle or a tritium particle to result in the generation of helium isotopes and excess neutrons by a nuclear fusion reaction. The neutron emission source thus does not require shielding during transport and is energized to the ON state only after being submerged to a certain depth in the fuel inspection pool, which avoids any need for additional personnel or apparatus shielding. The neutron emission source is situated at one side of a wing and generates a neutron stream, the detector array is situated on an opposite side of a wing, and the neutron emission source and detector array are robotically advanced along the wing. The detector array is monitored in real time to determine whether the detector array emits an output signal that is representative of a detection of a defect by measuring the neutron stream passing through the blade. If the detector array does not measure excessive transmission of neutrons through the wing anywhere along the length of the wing, that wing is deemed to have passed the inspection and to be acceptable. On the other hand, if the detector array at a given location on the wing detects the transmission of neutrons through the wing, various masks of the mask apparatus are positioned between the neutron emission source and the detector array to more specifically identify the position on the blade where the neutrons are passing through. Each mask is in the form of a plate-like neutron absorber having a small opening formed therein. By employing one or more masks and manipulating the one or more masks with robotic manipulators, the detector array can determine the precise position(s) on each wing where neutrons are detected as passing through the wing. Such processing can occur rapidly and, when completed, the results can be evaluated to determine whether or not that wing is passed or whether it is in need of replacement or repair.

Accordingly, an aspect of the disclosed and claimed concept is to provide an improved detection device that is usable to detect and evaluate the neutron absorption capability of a control element of a nuclear installation.

Another aspect of the disclosed and claimed concept is to provide an improved method of operating such a detection apparatus in the detection and evaluation a neutron absorption capability of a control element of a nuclear installation.

Another aspect of the disclosed and claimed concept is to provide such a device and method that enable the neutron absorption properties of a blade of a control element to be evaluated in real time.

Another aspect of the disclosed and claimed concept is to provide such an improved detection apparatus and method wherein an neutron emission source is capable of being switched between an OFF state and an ON state and which therefore does not require shielding during transportation or during use and rather relies upon the water in a fuel inspection pool for any shielding that may be needed when the neutron emission source is in its ON state.

Another aspect of the disclosed and claimed concept is to provide such an improved detection apparatus and method that allow for the rapid evaluation of the neutron absorption properties of a control element of a nuclear installation by providing a mask apparatus having a number of masks that can be used individually and in various combinations to enable a region of a blade at which neutrons have been detected as passing therethrough to be evaluated using progressively finer evaluation devices that permit a rapid evaluation of various portions of the blade with an appropriately high resolution without requiring evaluation of the entire blade at the same high resolution, thereby saving time.

As such, an aspect of the disclosed and claimed concept is to provide an improved detection apparatus that is usable to detect a neutron absorption capability of a control element of a nuclear installation, the detection apparatus can be generally stated as including a processor apparatus which can be generally stated as including a processor and a storage, a robot apparatus in communication with the processor apparatus and that can be generally stated as including a number of manipulators, a neutron radiograph apparatus that can be generally stated as including an neutron emission source, a detector array, and a mask apparatus, the neutron radiograph apparatus being structured to receive the control element generally between the neutron emission source and the detector array, the neutron emission source being switchable between an ON state and an OFF state, the neutron emission source in the ON state being in an electrically energized condition structured to generate a neutron stream, the neutron emission source in the OFF state being in an electrically de-energized condition structured to output no meaningful neutron stream, the detector array being structured to detect an unabsorbed portion the neutron stream that passes without being absorbed through the control element, the detector array being further structured to generate an output signal that is representative of the unabsorbed portion the neutron stream; and the mask apparatus being movable by at least a first manipulator of the number of manipulators among a number of positions, a position of the number of positions being that in which the mask apparatus is disposed at least partially between the neutron emission source and the detector array, another position of the number of positions being that in which the mask apparatus is removed from between the neutron emission source and the detector array.

Other aspects of the disclosed and claimed concept are provided by an improved method of operating the aforementioned detection apparatus to detect a neutron absorption capability of a control element of a nuclear installation wherein the nuclear installation has a pool of water available to accomplish control element inspection. The method can be generally stated as including receiving into the inspection pool of water with the neutron emission source in the OFF state, submerging the neutron emission source in the OFF state in the pool of water to a predetermined water depth, and switching the neutron emission source from the OFF state to the ON state when the control element inspection is to commence subject to the depth of the neutron emission source in the pool of water meeting or exceeding the predetermined water depth to provide adequate shielding to allow the neutron emission source to emit a neutron stream. The method potentially may further include receiving the detector array and the mask apparatus into the pool of water, receiving at least a portion of the control element generally between the neutron emission source and the detector array, and monitoring the detector array for the possible outputting therefrom of an output signal that would be representative of an unabsorbed portion the neutron stream passing without being absorbed through the at least portion of the control element.

BRIEF DESCRIPTION OF THE DRAWINGS

A further understanding of the disclosed and claimed concept can be gained from the following Description when read in conjunction with the accompanying drawings in which:

FIG. 4 is a side view of a portion of the inspection apparatus of FIG. 3;

FIG. 6 is an enlarged depiction of a position on a wing of the control element at which a neutron signal was detected and that additionally depicts a number of further positions within the position at which neutron signals are detectable with finer precision;

FIGS. 7A, 7B, and 7C depict an improved mask system in accordance with another embodiment of the disclosed and claimed concept that is configurable to have an opening whose dimensions are adjustable.

Similar numerals refer to similar parts throughout the specification.

DESCRIPTION

Figure 1:
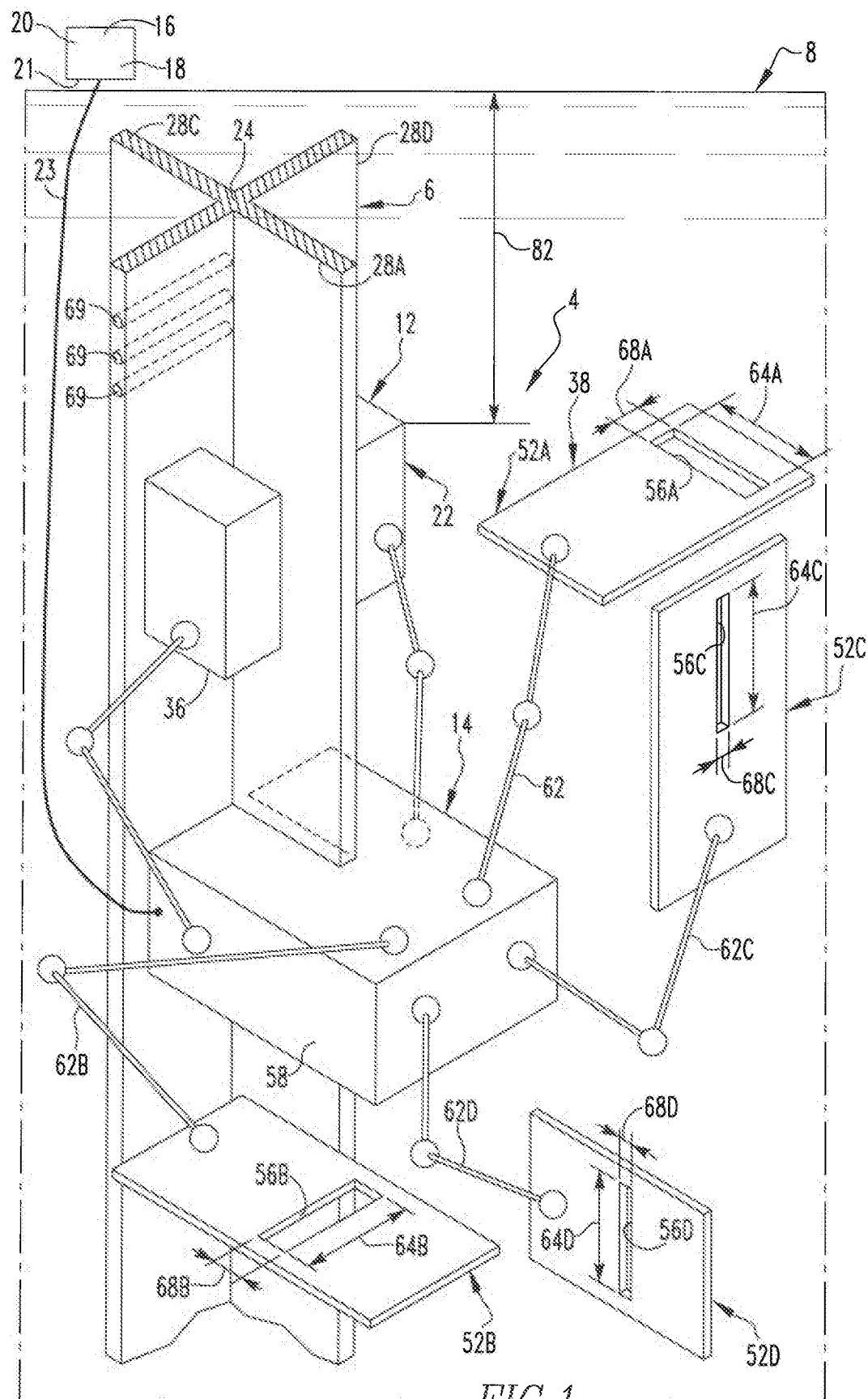
FIG. 1 depicts an improved detection apparatus in accordance with the disclosed and claimed concept that is situated on a control element of a nuclear installation.
Figure 2:
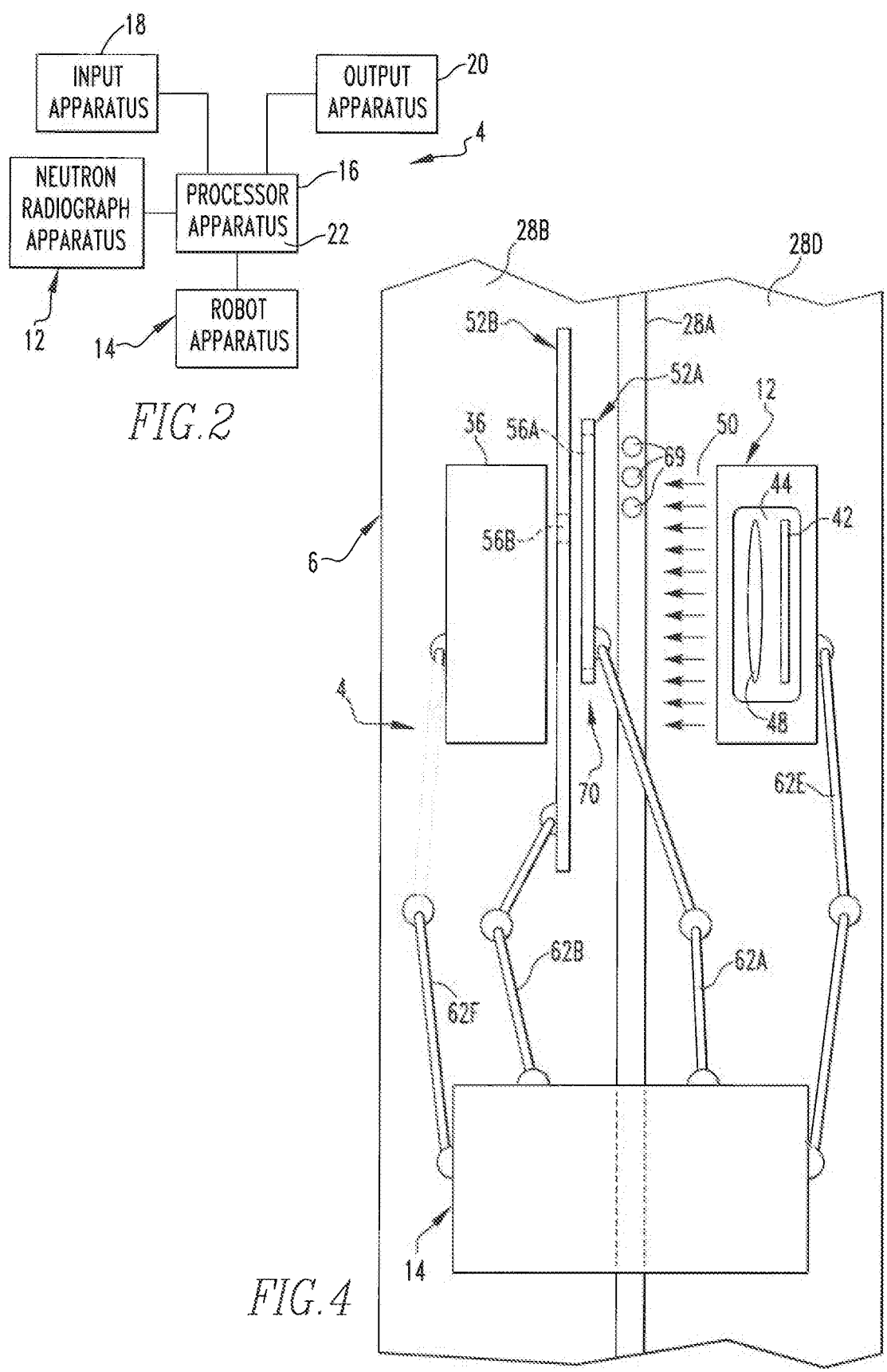
FIG. 2 is a schematic depiction of the detection apparatus of FIG. 1.
Figure 3:
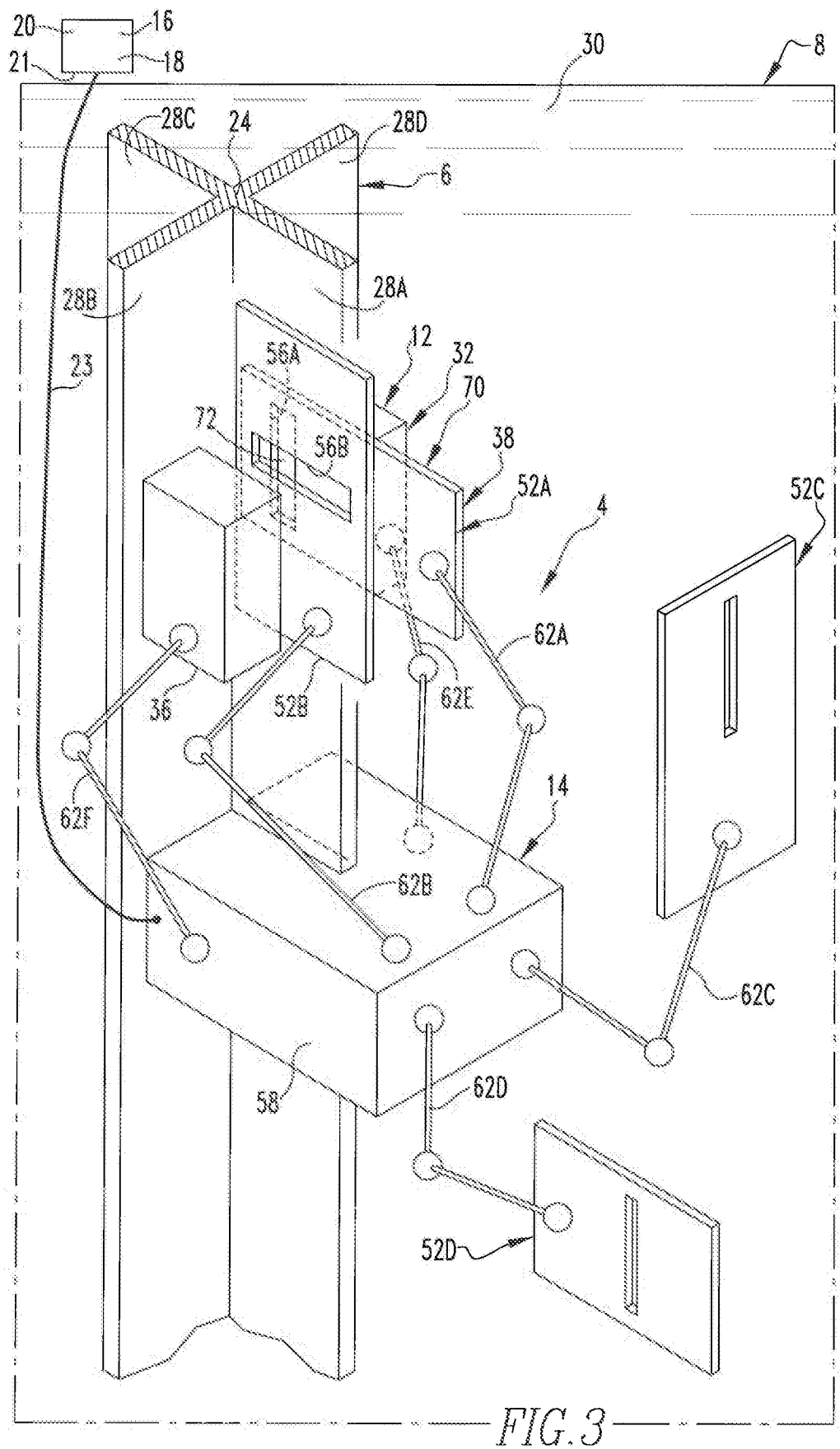
FIG. 3 is another depiction of the detection apparatus and other aspects of the method of FIG. 1.

An improved detection apparatus 4 in accordance with the disclosed and claimed concept is depicted generally in FIGS. 1 and 3-4 and it is depicted schematically in FIG. 2. The detection apparatus 4 is advantageously usable to inspect a control element 6 of a nuclear installation 8 for its capability of absorbing neutrons. FIGS. 1 and 3-4 depict the control element 6 having been removed from what would be its usual position situated among a plurality of fuel assemblies of the nuclear installation 8 and having been received in a water pool 30 such as used fuel pool although any pool of water can be used to receive the control elements 6 for the inspection method that is set forth in greater detail below and that is performed using the detection apparatus 4.

The detection apparatus 4 can be said to include a neutron radiograph apparatus 12, a robot apparatus 14, and a processor apparatus 16. Additionally, the detection apparatus 4 includes an input apparatus 18 that provides input signals to the processor apparatus 16 and an output apparatus 20 that receives output signals from the processor apparatus 16. Certain of the components, such as the processor apparatus 16, the input apparatus 18, and the output apparatus 20, or portions thereof, by way of example, may be situated on a control panel 21 that may be situated remotely from the robot apparatus 14 and which may be connected with the robot apparatus 14 via an umbilical 23. Other configurations of the various components will be apparent.

The processor apparatus 16 can include a number of various components and can be generally in the nature of a general purpose computer that includes a processor such as a microprocessor or other processor and storage such as RAM, ROM, EPROM, EEPROM, FLASH, and the like and that function in the nature of internal storage on a computer.

The processor apparatus 16 includes a number of routines 22 that are stored in the storage and that are executable on the processor to cause the processor apparatus 16 and thus the detection apparatus 4 to perform certain operations such as will be set forth in greater detail below. The input apparatus 18 can include any of a number detection devices or other input devices and can include the input terminals that are connected with the processor apparatus. The output apparatus 20 can include any of a wide variety of output devices and may include, for instance, visual displays, audio transducers, and data output devices, etc., without limitation.

As can be understood from FIGS. 1 and 3, the control element 6 is of an elongated cruciform shape that can be generally described as including a central hub 24 and a plurality of wings 28A, 28B, 28C, and 28D, which may be collectively or individually referred to herein with the numeral 28, and each of which extends from the hub 24. Each of the wings 28 has formed therein a number of passages 39, a small number of which are represented in dashed lines on the wing 28B, that are filled with a boron containing material or other neutron-absorbing material that causes the control element 6 to absorb neutrons. It is noted that all of the wings 28 have the passages 39 formed therein, and the passages 39 are situated along substantially the entirety of the length of each wing 28. As will be set forth in greater detail below, the detection apparatus 4 is advantageously usable to assess whether any one or more of the passages 39 that are formed in each of the wings 28 have lost their boron or other neutron absorbing material to render the control element 6 at any one or more positions thereon transparent to neutrons and thus to not absorb neutrons or to have reduced neutron absorption as such positions.

The neutron radiograph apparatus 12 can be said to include an neutron emission source 32, a detector array 36, and a mask apparatus 38. As a general matter, the neutron emission source 32 is switchable between an ON state and an OFF state. In the ON state, the neutron emission source 32 is in an electrically energized condition and is configured to output a neutron stream 50 such as is depicted generally in FIG. 4. In the OFF state, the neutron emission source 32 is in an electrically de-energized condition and outputs no meaningful stream of neutrons. The neutron emission source can be viewed as being shielded on all sides except the side that faces a wing 28 of the control element 6 and thus emits the neutron stream 50 generally only in one direction, namely that which faces toward the wing 28.

The neutron emission source 32 can be said to include an accelerator 42, a number of first particles 44, and a number of second particles 48. The accelerator 42 is a particle accelerator which, when electrically energized, has a potential difference of multiple hundred kilovolts. The ability to switch the accelerator 42 between an energized ON state and a de-energized OFF state advantageously enables the neutron emission source 32 to be switched between the ON and OFF states.

In the exemplary embodiment depicted herein, the first particles 44 are a number of deuterium particles. Also in the exemplary embodiment depicted herein, the second particles 48 can be either deuterium particles or tritium particles. When the accelerator 42 is in its electrically energized ON state, it accelerates the first particles 44 to cause them to impact the second particles 48 to cause nuclear fusion of the deuterium and/or tritium particles and thereby produce neutrons that form the neutron stream 50. In the situation wherein the second particles 48 are deuterium particles, the collision of one of the first particles 44 with one of the second particles 48 produces helium three (He3, which includes two protons plus a neutron in the nucleus) plus an additional neutron that is emitted as a part of the neutron stream 50. In the situation where the second particles 48 are tritium particles, the collision of one of the first particles 44 with one of the second particles 48 result in the generation of helium four (He4, which includes two protons and two neutrons in the nucleus) plus an additional neutron that is emitted as a part of the neutron stream 50.

The detector array is a device that is configured to detect neutrons and, in particular, the neutron stream 50 and can be viewed as likewise being shielded on all sides except for the side that faces toward a wing 28. The detector array 36 can be any of a wide variety of devices that detect neutrons including but not limited to an ion chamber containing or coated with BF3, He3, enriched uranium (fission chamber) or other such isotopes that absorb neutrons and thereby promptly release a charged particle such as an alpha or beta particle, proton, deuteron, or fission fragments that can be subsequently collected and measured as a charge pulse or integrated into a current. The detector array 36 desirably will have a high neutron sensitivity and also have the ability to reject gamma radiation that is necessarily a component of a normal, irradiated control element. When the detector array 36 detects a neutron signal that exceeds a certain threshold, meaning a detection of portion of the neutrons from the neutron stream 50 that meets or exceeds a predetermined threshold, the detector array 36 outputs an alert signal that is received at the input apparatus 18 as an input to the processor apparatus 16. In response to the reception of such an alert signal originating from the detector array 36, the routines 22 may initiate further processing in the location where the detector array 36 is situated. Additionally or alternatively, the routines 22 may cause the processor apparatus 16 to generate some type of an output signal that is communicated to the output apparatus 22 and that generates an output that is detectable by a technician, for example.

The mask apparatus 38 can be said to include a plurality of masks, at least some of which are represented by the four exemplary masks that are shown in FIGS. 1 and 3 and which are indicated at the numerals 52A, 52B, 52C, and 52D, and which may be collectively or individually referred to herein with the numeral 52. As will be explained below, the masks 52 can be said to additionally include another mask 85 that is depicted in FIG. 5C and may include other masks without limitation. The masks 52 are each of a plate-like configuration and are formed of a neutron absorbing material such as cadmium or other appropriate material. The masks 52A, 52B, 52C, and 52D each have an opening formed therein that is indicated, respectively, at the numerals 56A, 56B, 56C, and 56D, and which can be collectively or individually referred to herein with the numeral 56. In the depicted exemplary embodiment, the openings 56 are each in the form of an elongated slot wherein the material of the corresponding mask 52 has been removed, which thus permits neutrons to flow through the opening 56 if such a portion of the neutron stream 50 exist in the vicinity of the opening 56. The masks 52 with the openings 56 formed therein can each additionally or alternatively each be referred to as being a collimator.

The robot apparatus 14 can be said to include a support 58 and a plurality of manipulators that are situated on the support 58 and that are indicated at the numerals 62A, 62B, 62C, 62D, 62E, and 62F, which may be collectively or individually referred to herein with the numeral 62. The manipulators 62 are each robotic manipulators having one end situated on the support 58 and another end opposite thereto carrying a component of the neutron radiograph apparatus 12. In the depicted exemplary embodiment, the manipulators 62A, 62B, 62C, and 62D carry at the free end thereof a corresponding mask 52A, 52B, 52C, and 52D, respectively. The manipulator 62E carries the neutron emission source 32, and the manipulator 62F carries the detector array 36. The manipulators 62 are each robotically operated and thus are operable independently of one another to move the masks 52 and the neutron emission source 32 and the detector array 36 independently of one another. It is expressly noted that the neutron radiograph apparatus 12 and the robot apparatus 14 are depicted herein as including only four masks 52 (plus the mask 85) and four corresponding manipulators 62 that carry the masks 52, but it is understood that any number of manipulators 62 and any number of masks 52 can be employed depending upon the needs of the particular application, as will be set forth in greater detail below.

The openings 56A, 56B, 56C, and 56D in the depicted exemplary embodiment are each of an elongated approximately rectangular shape having a length 64A, 64B, 64C, and 64D, respectively and a width 68A, 68B, 68C, and 68D, respectively. As mentioned above, the masks 52 themselves absorb neutrons, but the openings 56 permit neutrons to flow therethrough.

The robot apparatus 14 additionally includes some type of a robotic tractor mechanism that is situated on the support 58 and which engages the control element 6 on a wing 28 thereof or otherwise and moves the support 58 with respect to the control element 6 or vice versa. In this regard, it is understood that detection apparatus 4 or the support 58 or both may include additional structures or support elements that are situated at the base of the water pool 30 and which are configured to receive and to carry thereon the control element 6 when it is received in the water pool 30. Alternatively, the control element 6 can simply be received in the water pool 30 and can have the support 58 received thereon, with the tractor then being robotically operated to move the support 58 along the longitudinal extent of the control element 6.

In use, the detection apparatus 4 with the neutron emission source 32 in its OFF state is received in the water pool 30 and is submerged therein until the neutron emission source 32 is situated at a predetermined depth 82 (FIG. 1) within the water pool 30. At the predetermined depth 82, the neutron emission source 32 can be switched to its ON state because the water in the water pool 30 provides sufficient shielding from the neutron stream 50 that no additional shielding is required to protect personnel from the neutron stream 50. Advantageously, therefore, the detection apparatus 4 relies upon the shielding that already exists in the water pool 30 to shield personnel from the neutron stream 50 when the neutron emission source is in its ON state. The ability to switch the neutron emission source between the ON and OFF states avoids the need for other shielding when the neutron emission source 32 is being transported from one location to another and prior to the neutron emission source 32 being submerged to the predetermined depth 82. That is, the neutron emission source 32 during transport and prior to being submerged to the predetermined depth 82 is imply in its OFF state and is not placed in its ON state until it is submerged to a depth in the water pool 30 at or below the predetermined depth 82.

When the support 58 is situated on the control element 6 or vice versa, the manipulators 62E and 62F are operated to cause the neutron emission source 32 and the detector array 36 to be situated at opposite surfaces of the wing 28 that is to be inspected, which is the wing 28A in FIGS. 1, 3, and 4.

Since the neutrons exiting the neutron emission source 32 are at too high of an energy state to be detected by the detector array 36, the neutron emission source 32 must be spaced away from the surface of the wing 28 by a sufficient distance to enable the neutrons to be thermalized and thus slowed sufficiently that the neutrons of the neutron stream 50 that pass through the wing 28 can be absorbed by the control element or, in the case of a defect, be detected by the detector array 36.

At the initial stage of the detection operation, the manipulators 62 that have a mask 52 situated thereon are arranged such that the masks 52 are positioned away from the neutron emission source 32 and the detector array 36, such as is depicted generally in FIG. 1. The neutron emission source 32 is then switched to its ON state if it is not already in such a state, and the detector array 36 output signal is monitored to determine whether there is a defect at any given position on the wing 28.

If no output is detected from the output 36, the tractor on the support 58 is operated to cause the support 58 and thus the manipulators 62 and the neutron radiograph apparatus 12 situated thereon to be advanced along the longitudinal extent of the control element 6. If no signal is detected from the detector array 36 at any point along the longitudinal extent of the wing 28 that is being inspected, the wing 28 is considered to be good, meaning that it has no regions thereon where neutrons from the neutron stream 50 pass unabsorbed through the wing 28, and rather the wing 28 has absorbed all portions of the neutron stream 50 without permitting any portions of the neutron stream 50 to be detected by the detector array 36. The process can then be repeated for the other wings 28 on the control element 6 until all of the wings 28 have been inspected.

On the other hand, the detector array 36 may, at some location along the wing 28, generate an output signal that is received by the input apparatus 18 and is provided as an input to the processor apparatus 16 whereupon one of the routines 22 will view the signal originating from the detector array 36 as being indicative of the detection of a portion of the neutron stream 50 that has passed unabsorbed through the wing 28 at such location. An exemplary set of passages 69 are depicted in FIGS. 1 and 4 and demonstrate that the neutron emission source 32 and the detector array 36 are at any given time adjacent a plurality of the passages 69 that are formed in the wing 28 that is being evaluated. As such, an output signal from the detector array 36 that the detector array 36 has detected a portion of the neutron stream 50 passing through the wing 28 does not, of itself, indicate which of the one or more passages 69 that are situated adjacent the detector array 36 may be breached and may have lost its boron or other neutron absorbing substance. It is noted, however, that the mere detection of an output from the detector array 36 signaling the passage through the wing 28 of an unabsorbed portion of the neutron stream 50 does not automatically result in rejection of the wing 28 or the control element 6 as being defective and in need of replacement. Rather, if the result of the analysis presented herein is that a given control element 6 has no more than a predetermined number of failed positions (i.e., meaning positions thereon where neutrons are not being absorbed), and if the distribution of such positions is sufficiently scattered, the control element 6 can be declared to be effective and not in need of replacement. It is necessary, however, to determine the extent and location of any such positions on the control element 6 where neutrons are not being absorbed and are passing through the control element 6. As noted above, however, the detection of an output signal from the detector array 36 does not necessarily indicate which of the passages 69 is/are in a state of partial or total failure. As such, whenever the detector array 36 provides an output signal that is representative of a neutron signal being detected at a position on the wing 28 where neutrons are passing unabsorbed therethrough, the mask apparatus 38 is operated to more finely analyze the region of the wing 28 where the neutron emission source 32 and the detector array 36 are disposed in order to determine with greater specificity exactly what positions on the wing 28 are permitting neutrons to pass therethrough.

Advantageously, therefore, the mask apparatus 38 is deployed, such as is depicted generally in FIG. 3 by operating one or more the manipulators 62 to position one or more of the masks 52 between the neutron emission source 32 and the detector array 36 to block from the detector array 36 all neutrons except those neutrons from the neutron stream 50 that are passing through the opening 56 that is formed in each of the masks 52 that have been deployed in such a masking fashion. While the masks 52 are individually deployable by the corresponding manipulators 62, it can be understood that any individual deployed mask 52 will block all of the neutrons of the neutron stream 50 except in the location where the opening 56 is situated, which may be a region having the length 64 and the width 68 of the corresponding opening 56 of the mask that is being situated between the neutron emission source 32 and the detector array 36. However, if a plurality of the masks 52 are deployed and positioned such that the openings 56 overlie one another, the portion of the neutron stream 50 that can be received by the detector array 36 is only that portion of the neutron stream 50 that passes through the wing 28 and that also passes through the region where the corresponding openings 56 are overlying one another. Such a cooperating plurality of masks 52 can be referred to herein as being a mask system 70, and the overlying portions of the openings 56 of the masks 52 of the mask system 70 can be said to form an orifice 72. If the openings 56 are oriented perpendicular to one another, the resulting orifice 72 is much smaller than the cross-sectional area of the detector array 36, meaning that relatively smaller portions of the wing 28 (i.e., smaller than the cross section dimensions of the detector array 36) can be separately inspected to determine whether each such position on the wing 28 is defective and is permitting neutrons from the neutron stream 50 to pass therethrough.

Figure 5A:
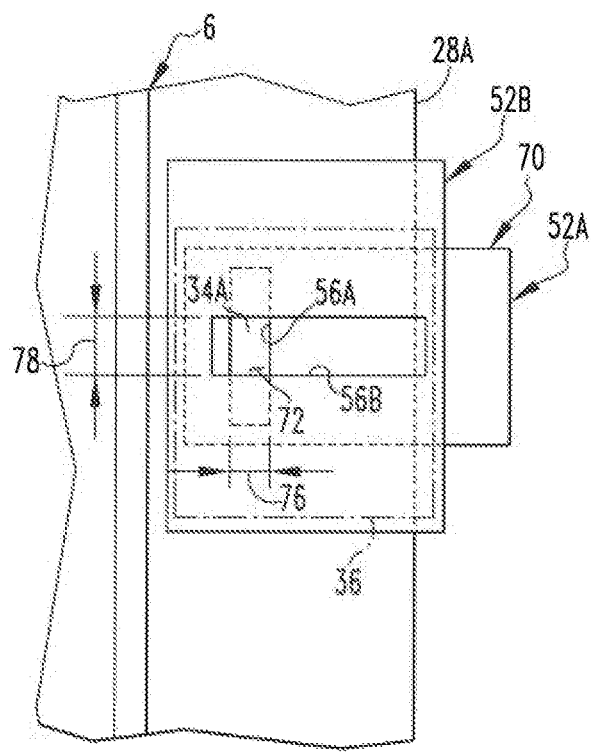
FIG. 5A is a depiction of a portion of a mask apparatus of the detection apparatus of FIG. 1.

As can be understood from FIG. 5A, the mask system 70 has the orifice 72, which can be understood to be much smaller than the detector array 36 that is overlying the wing 28. It is noted that FIGS. 5A, 5B, 5C, and 5D depict in phantom lines an exemplary outline of the detector array 36 as it would be situated overlying the wing 28, but with the detector array 36 having been removed in order to better visualize the overlying openings 56 in the masks 52.

As can be understood from FIG. 5A, the orifice 72 can be said to have a first dimension 76 (which, in the exemplary embodiment depicted herein, is equal to the width 68A) and a second dimension 78 (which, in the depicted exemplary embodiment, is equal to the width 68B). With the masks 52A and 52B of that particular mask system 70 being situated as depicted in FIG. 5A, the detector array 36 is monitored to determine whether it generates an output signal that would be representative of neutrons from the neutron stream 50 passing through the orifice 72 which overlies a given position 84A on the wing 28. If a signal is detected from the detector array 36, this fact is recorded in the processor apparatus 16. That is, the processor apparatus 16 would record the fact that neutrons were detected at the position 84A on the wing 28. On the other hand, if neutrons were not detected when the mask system 70 was positioned as depicted in FIG. 5A, the processor apparatus 16 may (and likely would) record the fact that neutrons were not detected at the position 84A on the wing 28.

Figure 5B:
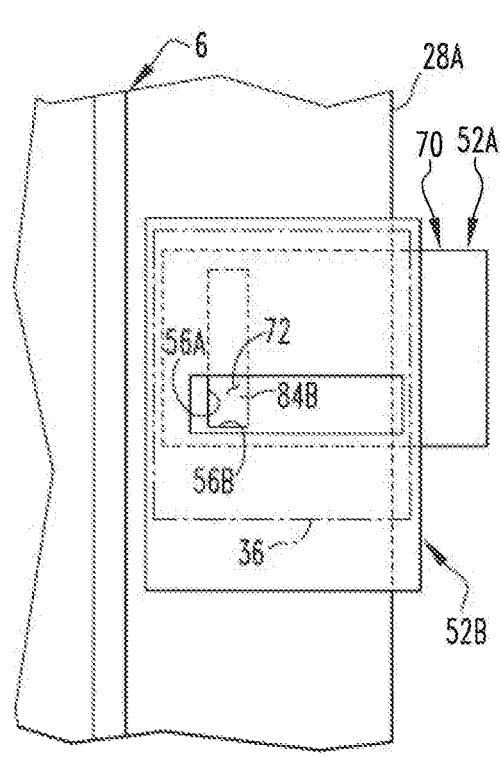
FIG. 5B is another depiction of the mask apparatus of FIG. 5A, except during a different portion of the method.
Figure 5C:
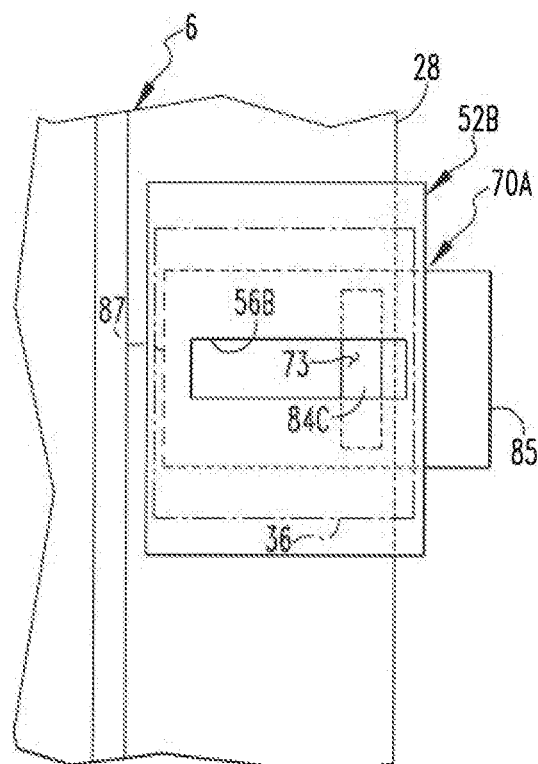
FIG. 5C is a depiction of another portion of the mask apparatus during another portion of the improved method.
Figure 5D:
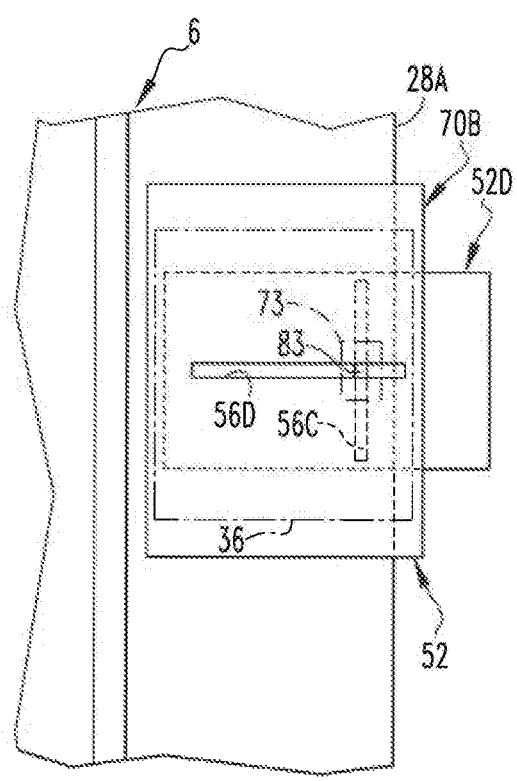
FIG. 5D is a depiction of another portion of the mask apparatus during still another portion of the improved method.

The mask system 70 then can be manipulated to move the orifice 72 to a different position, such as the position 84B that is depicted in FIG. 5B. As can be understood from a comparison of FIGS. 5A and 5B, it can be understood that the orifice 72 was moved from the first position 84A of FIG. 5A to the second position 84B of FIG. 5B by employing the manipulator 62B to translate the mask 52 in the vertically downward direction from the perspective of FIGS. 5A and 5B when going from FIG. 5A to FIG. 5B. With the mask system 70 as arranged in FIG. 5B, the detector array 36 is monitored to determine whether it is generating an output signal that would be indicative of neutrons passing through the orifice 72 at the position 84B. Whether or not an output signal is detected from the detector array 36 when the orifice 72 overlies the position 84B is recorded in the processor apparatus 16. In this regard, it is understood that any number of intermediate positions between the position 84A of FIG. 5A and the position 84B of FIG. 5B can also be evaluated for the detection of neutrons by the detector array 36 and such detection (or non-detection) recorded in the processor apparatus 16, as appropriate.

The mask apparatus 38 thus can be manipulated until all of the positions on the wing 28 that are adjacent the detector array 36 have been evaluated by overlying the orifice 72 over such positions and detecting whether or not the detector array 36 has generated an output signal that is indicative of neutron passage at such position on the wing 28. In so doing, it may be necessary to employ different masks, such as is depicted in FIG. 5C wherein the mask 52B is combined with the other mask 85 of the mask apparatus 38 to form another mask system 70A having an orifice 73 overlying another position 84C on the wing 28. For instance, the mask 52A may have been withdrawn and the mask 85 deployed in its place. The other mask 85 was not depicted in FIGS. 1 and 3 for reasons of simplicity of disclosure. The mask 85 is manipulated separately by its own manipulator of the robot apparatus 14 that is likewise not depicted in the accompanying drawings for reasons of simplicity of disclosure. In the depicted exemplary embodiment, the orifice 73 of FIG. 5C has the same first and second dimensions 76 and 78 as the orifice 72 of FIGS. 5A and 5B.

It can be seen that the mask 85 has its own opening formed therein that is positioned thereon at approximately the middle thereof rather than being situated closer to the end thereof (as is the case with the mask 52A), and this enables an end 87 of the mask 85 to extend beyond the edge of the opening 56B. That is, the various masks (such as are indicated at the numerals 52, 85, etc. and which can include other masks that are not expressly depicted herein) are configured such that in various combinations they can completely block the passage of neutrons from the neutron stream 50 that may pass through the wing 28 other than the neutrons that additionally pass through the orifice 72 or 73, by way of example.

It can be understood that the movement of one or more of the masks 52 with respect to other masks 52 and the like can be programmed into one of the routines 22 and executed by the processor apparatus 16 and the robot apparatus 14 that is connected therewith. Likewise, the selection of the various masks 52 and 85 and other such masks that may not be expressly depicted herein and their use in combination with other such masks 52 can likewise be programmed into one of the routines 22.

It thus can be understood from the foregoing that the detector array 36 situated at the location depicted generally in FIG. 5A had generated an output signal, indicating that neutrons were passing from the neutron stream 50 through the wing 28 at one or more positions on the wing 28 directly adjacent the detector array 36 and were being detected by the detector array 36. As such, the masks 52A and 52B were deployed and were positioned as is depicted in FIG. 5A. The mask system 70 was manipulated such that the orifice 72 thereof was successively positioned, in a raster-like fashion, across all of the positions (84A, 84B, 84C, etc.) between the detector array 36 and the wing 28 to determine at which of such positions the detector array 36 again produced an output that is indicative of neutrons. In other words, the detector array 36 positioned as situated in FIGS. 5A-5C detected neutrons at some position on the wing 28 adjacent the detector array 36, and the various masks 52 were thus deployed between the detector array 36 and the wing 28 and were positioned to move the orifice 72 among all of the positions (such as the positions 84A, 84B, and 84C) to determine with greater specificity the particular position(s) on the wing 28 adjacent the detector array 36 where neutrons were actually passing through the wing 28.

By way of example, it may have been determined that a positive signal was received from the detector array 36 only at the position 84C in FIG. 5C. This would indicate that when the detector array 36 was situated in the location on the control element 6 that is depicted in FIGS. 5A-5C, and when the detector array 36 initially generated its output signal representative of detecting neutrons somewhere along its cross-sectional area, it really was detecting neutrons somewhere within the position 84C. This would indicate that the wing 28 has a failed region within position 84C.

Depending upon the sizes of the transverse dimensions of the orifice 73, the determination, as in FIG. 5C, that the position 84C was the source of neutrons may be sufficiently precise information that no further analysis is needed. On the other hand, it may be decided that merely identifying position 84C to the processor apparatus 16 is insufficiently accurate to evaluate the overall ability of the control element 6 to absorb neutrons, whether simply at the location or overall, and that more specific and fine detail may be warranted, as is depicted generally in FIGS. 5D and 6. For instance, it may be decided to remove the masks 52B and 58 from being situated adjacent the detector array 36 and to instead deploy the masks 52C and 52D to form another mask system 70B whose openings 56C and 56D are relatively narrower than those of the mask system 70A. That is, the widths 68C and 68D are relatively narrower than the widths 68B and the width of the opening in the mask 58. As such, the openings 56C and 56D overlaid as in FIG. 5D may form a relatively smaller orifice 83 having relatively smaller first and second dimensions 76A and 78A (FIG. 6), i.e., relatively smaller than the first and second dimensions 76 and 78 of the orifices 72 and 73.

The mask system 70B can be manipulated such that the orifice 83 is successively positioned along a plurality of further positions 88 that are depicted in FIG. 6 and are themselves each discrete areas within the position 84C that was identified in FIG. 5C as having neutrons passing therethrough from the neutron stream 50. As such, the masks 52C and 52D can be manipulated by the manipulators 62C and 62D such that the resultant orifice 83 moves in a raster-like fashion across the position 84C among the various further positions 88 until a number of the further positions 88 are detected to have a neutron signal passing therethrough. Whether or not the detector array 36 output its alarm signal coincident with any of the further positions 88 is recorded in the processor apparatus 16.

The exemplary further positions 88 where neutrons were detected are indicated schematically in FIG. 6 with cross-hatching and are represented at the numerals 90A, 90B, 90C, 90D, and 90E, which may be collectively or individually referred to herein with the numeral 90. If the detection of a neutron signal at the further positions 90 is information that is sufficiently detailed and precise, the evaluation of the position 84C can end and the detector array 36 can be moved to another location along the length of the control element 60. Alternatively, if more detailed analysis of the further positions 90 is desired, further masks 52 having even smaller openings formed therein can be deployed to evaluate in a raster-like fashion a number of smaller areas within each of the further positions 90, and the resulting output signals from the detector array 36 coincident with such smaller areas recorded in the processor apparatus 16, until sufficiently detailed information regarding exactly where on the wing 28 the neutron stream 50 is passing through is obtained. It is reiterated that all such outputs from the detector array 36 are received in real time at the processor apparatus 16.

It is understood that the initial use of the detector array 36 without the mask apparatus 38 until the detector array 36 provides an output, and then the responsive use of masks 52 having progressively smaller openings 56 at the positions (84A, 84B, and 84C, for example) and further positions 84 and 90 (further by way of example) where neutron signals were detected saves inspection time and results in a rapid inspection procedure. While the entire wing 28 can be evaluated at the finest possible orifice size, such evaluation of the entire wing with such fineness would take an excessively long period of time and likely would be unnecessary. However, by performing a relatively coarse analysis by using the masks 52A and 52B with relatively larger openings 56A and 56B to identify, on a coarse basis, the various positions 84 where a neutron signal is detected, and by then performing a relatively finer evaluation using the masks 52C and 52D having the relatively smaller openings 56C and 56D, the relatively finer evaluation is done only at the positions 84 where it is known that a neutron signal exists. As such, the various positions where no signal is detected can be rapidly evaluated and ignored using the relatively coarse analysis afforded by the masks 52A and 52B, and the relatively finer analysis can be deployed only where neutron signals are known to have been detected. The use of such progressively finer evaluation at the positions where neutron signals are detected provides for a greater efficiency and minimized time waste.

It is understood that the various masks 52 that are used may be dependent upon the configuration of the passages 69 in the control element 6. As mentioned above, the passages 69 that are depicted in an exemplary fashion in FIG. 1 in the wing 28B (and which are representative of the passages 69 that are situated along substantially the entirety of the lengths of all of the wings 28) represent one known way of configuring the passages 69 with the boron or other neutron absorbing substance contained therein, i.e., perpendicular to the longitudinal extent of the hub 24. As noted above, an alternative design exists wherein the passages that contain the boron or other neutron absorbing materials are oriented parallel with the longitudinal extent of the hub 24. It thus may be desirable to provide masks of different configurations having openings with different sizes and/or shapes and/or orientations that are optimized to evaluate such an alternative arrangement of passages.

An alternative mask system 170 is depicted in FIGS. 7A-7C. The alternative mask system 170 is configured such that its opening 156 can selectively have a plurality of different dimensions. This is accomplished by configuring the mask system 170 to include a plate-like first member 154 having a notch 160 formed therein and by further providing a plate-like second member 166 which is movable with respect to the first member 154. In this regard, a separate robotic tractor may be provided on the mask system 170 to move the second member 166 with respect to the first member 154 or vice versa. As can be understood from FIGS. 7A-7C, the opening 156 is of a fixed length 164, but the width is variable between, for instance, a relatively wider width 168A (such as is depicted in FIG. 7A), a relatively smaller width 168B (such as is depicted in FIG. 7B), and a further smaller width 168C (as is depicted in FIG. 7C). The various widths 168A, 168B, and 168C are exemplary and can be larger, smaller, etc. without departing from the spirit of the present disclosure.

By way of example, the mask system 170 potentially could take the place of the mask 52A being removed and replaced with the mask 52C having the relatively narrower opening 56C. Likewise, another instance of the mask system 170 could take the place of both the masks 52B and 52D and would avoid having to remove the mask 52B to be replaced with the mask 52D. Rather, the mask system 170 could be retained in place adjacent the detector array 36 and simply manipulated to make its opening 156 relatively narrower, such as by progressively changing it such that its width goes from that depicted in FIG. 7A and is indicated at the numeral 168A until the width is reduced to that indicted at the numeral 168C in FIG. 7C. The mask system 170 could be used with additional instances of the mask system 170 or with other masks 52 without limitation.

It can be understood that the mask system 170 could take other forms that permit not only the width of the opening 156 to be changed, but also the length 164 can be changed as well as the position of the opening 156 thereon can likewise be changed. Any of a number of configurations of additional mask systems that provide various opening positions or dimensions and both can be envisioned.

Figure 8A:
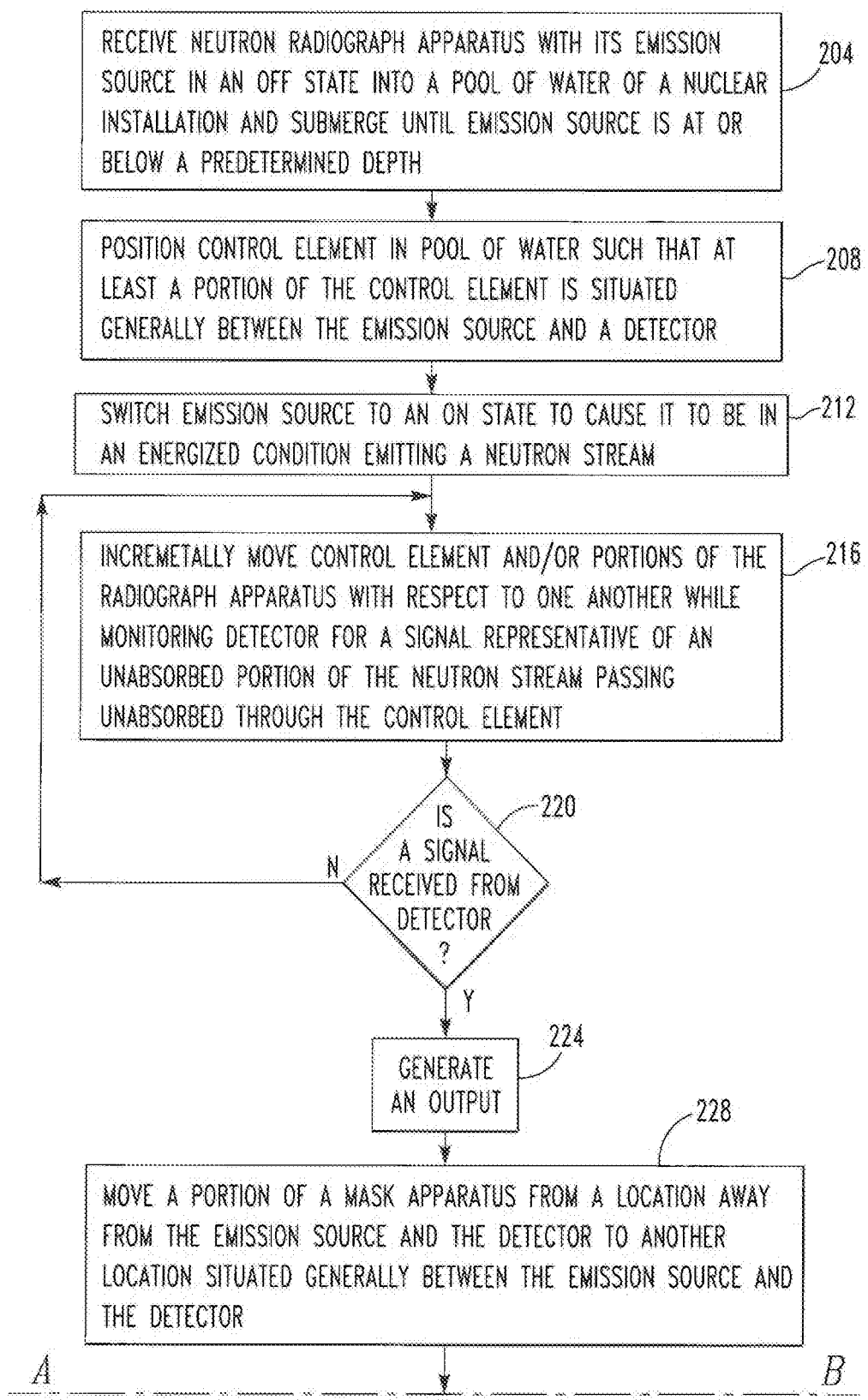
FIGS. 8A and 8B are a flowchart depict certain aspects of an improved method in accordance with the disclosed and claimed concept.
Figure 8B:
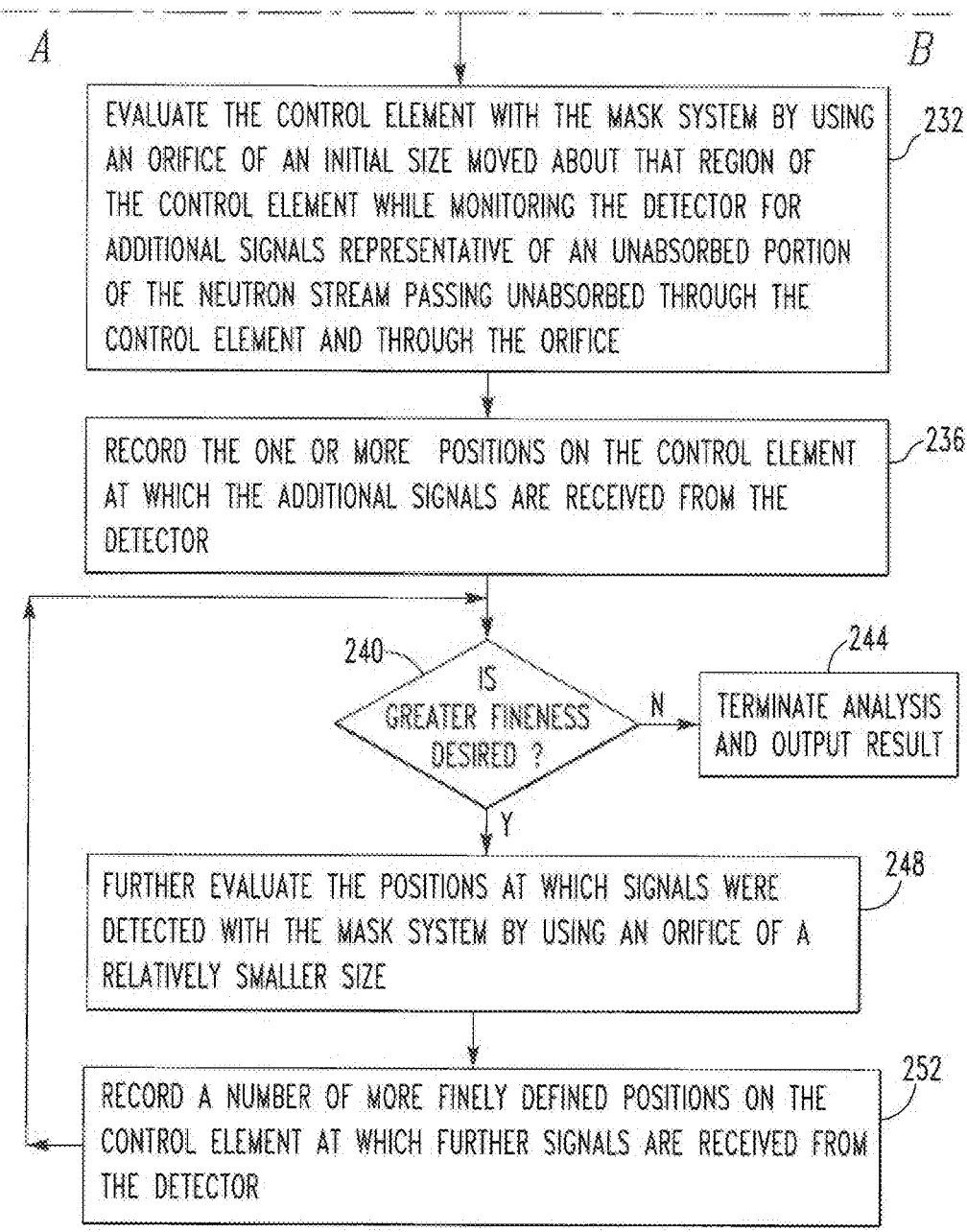

An improved method in accordance with the disclosed and claimed concept is depicted generally in FIGS. 8A and 8B. Processing can be said to begin, as at 204, where the neutron radiograph apparatus 12 in its OFF state is received in the inspection water pool 30 of the nuclear installation 8 and is submerged until the neutron emission source 32 is at or below the predetermined depth 82. The control element 6 can then be positioned, as at 208, in the water pool 30 such that a wing 28 or other portion of the control element 6 is situated generally between the neutron emission source 32 and the detector array 36. The neutron emission source 32 can then be switched from its OFF state to its ON state, as at 212, by energizing the accelerator 42 to cause it to emit the neutron stream 50. The support 52 can then be incrementally moved with respect to the control element 6 or vice versa while the detector array 36 is monitored for the possible outputting of a signal from the detector array 36 that would be representative of an unabsorbed portion of the neutron stream 50 passing unabsorbed through a portion of the control element 6. Such an output, if detected, could be received by the input apparatus 18 and provided as an input signal to the processor apparatus 16. If, as at 220, no signal above a threshold value is detected from the detector array 36, processing can continue, as at 216, where the neutron radiograph 12 is incrementally moved farther along the control element 6. On the other hand, if at 220 a signal is received from the detector array 36, an output can be generated, as at 224. The output, as noted above, can be received by the input apparatus 18 and can result in the outputting of an alarm signal or the triggering of a routine 22 to manipulate the mask system 38, or both.

For example, and as at 228, a portion of the mask apparatus 38 can be moved from a location that is disposed generally away from the neutron emission source 32 and the detector array 36 to another location situated generally between the neutron emission source 32 and the detector array 36. Processing can then continue, as at 232, where the control element 6 is evaluated using the mask system 38 by using an orifice 72 that is of an initial size and that is moved in a raster-like fashion about that region of the control element 6 while monitoring the detector array 36 for additional signals that would be representative of an unabsorbed portion of the neutron stream 50 passing unabsorbed through the control element 6 and through the orifice 72. As at 236, the processor apparatus 16 can record the one or more positions on the control element 6 at which the additional signals were received from the detector array 36. If it is determined, as at 240, that greater fineness in the evaluation is not needed, the analysis can be terminated, as at 244, and the results of the analysis can be output for expert evaluation.

However, if it is determined at 240 that further fineness in the evaluation is desired, processing can continue, as at 248, where a further evaluation of the positions at which the signals were detected with the detector array 36 can be carried out by using the mask system and an orifice 83 of a relatively smaller size. Again, such analysis would be performed in a raster-like fashion as set forth above, or can be carried out in other fashions without departing from the spirit of the present disclosure. Recordation can occur, as at 252, as to any one of more finely defined positions on the control element 6 at which further signals have been received from the detector array 36.

It is understood that the procedure noted above can be performed in any of a variety of different orders depending upon the need for efficiency. For example, it is possible that the wing 28 may be evaluated in its entirety using the neutron emission source 32 and the detector array 36 without deployment of the mask apparatus 38 in order to find the various locations thereon where neutron signals are detected. Afterward, another pass can be made using the masks 52A and 52B having the relatively larger openings 56A and 56B, and such mask system 70 can be moved in a raster-like fashion across the various locations that were detected and stored during the first pass when the mask apparatus 38 was not employed. The various positions where signals are detected with the masks 62A and 62B in place would be recorded. This could occur across the entirety of the length of the wing that is being evaluated. Then, perhaps, a further pass can be performed across the entirety of the length of the control element using the relatively finer masks 52C and 52D, and only those positions where signals have been detected and stored would be the subject of further analysis by the mask system 70A. Other variations will be apparent.

It thus can be understood that the detection apparatus and the method described herein permit rapid evaluation of the control element 6 and permits a determination to be made whether the control element is in need of replacement or whether the control element 6 can be redeployed in the nuclear installation 8. It is possible that variations of the detection apparatus 4 can be provided wherein multiple wings 28 are simultaneously evaluated using multiple neutron emission sources and detector arrays. The neutron emission source 32 advantageously can be switched between an OFF condition and an ON condition, thereby avoiding the need for shielding when the emissions source 32 is being transported from one location to another. As mentioned above, known californium neutron emission sources cannot be switched off, and thus the neutron emission source 32 advantageously avoids the need for the separate, heavily shielded shipping cask required to transport a californium source without the presence of a 5 meter deep large pool of water. Additionally, the evaluation using the detector array 36 and the mask system 38 provides real time analysis of the wing 28, which enables greater efficiency in directing the evaluation, and it also avoids the need for prolonged exposure of film, to a neutron source. Additionally, the configuration of the mask apparatus 38 to provide progressively smaller orifices to provide finer evaluation only in those positions where such finer evaluation is needed saves evaluation time and results in a rapid overall evaluation of the control element 6. Further advantages will be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A detection apparatus usable to detect a neutron absorption capability of a control element of a nuclear installation, the detection apparatus comprising:
   a number of manipulators;
   a neutron radiograph apparatus comprising an neutron emission source, a detector array, and a mask apparatus, the neutron radiograph apparatus being structured to receive the control element generally between the neutron emission source and the detector array; and
   the mask apparatus being movable by at least a first manipulator of the number of manipulators among a number of positions, the number of positions comprising a plurality of different positions disposed at least partially between the neutron emission source and the detector array.

2. The detection apparatus of claim 1 wherein the mask apparatus comprises a mask system having an orifice formed therein, the mask system being structured to generally resist the passage therethrough of the neutron stream but permitting passage of at least a part of the neutron stream through the orifice.

3. The detection apparatus of claim 2 wherein the orifice has a number of physical dimensions in a number of directions transverse to the part of the neutron stream, the number of manipulators being operable to change at least one physical dimension of the number of physical dimensions between a first size and a second size different than the first size.

4. The detection apparatus of claim 3 wherein the mask system comprises a first mask having a first opening formed therein and a second mask having a second opening formed therein, the number of manipulators being operable to manipulate at least one of the first mask and the second mask to overlie at least a portion of at least one of the first opening and the second opening with at least a portion of the other of the first opening and the second opening to form the orifice from the overlying at least portions of the first and second openings.

5. The detection apparatus of claim 4 wherein whereby movement of one of the first mask and the second mask with respect to the other of the first mask and the second mask changes the at least one physical dimension between the first size and the second size.

6. The detection apparatus of claim 4 wherein the number of manipulators are operable to at least partially receive at least one of the first mask and the second mask between the neutron emission source and the detector array separately from the other of the first mask and the second mask.

7. The detection apparatus of claim 4 wherein at least one of the first opening and the second opening has a length and a width that are controlled by the number of manipulators.

8. The detection apparatus of claim 4 wherein at least one of the first mash and the second mask is of a generally plate-like configuration.

9. The detection apparatus of claim 1 wherein the neutron emission source is switchable between an ON state and an OFF state, the neutron emission source in the ON state being in an electrically energized condition structured to generate a neutron stream, the neutron emission source in the OFF state being in an electrically de-energized condition structured to output no meaningful neutron stream, and wherein the neutron emission source comprises an accelerator structured to accelerate light atomic ions, typically, but not limited to hydrogen isotopes so as to induce nuclear fusion reactions in a target on which the beam is focused in the ON state of the neutron emission source, the accelerator being of variable strength in both variable beam current and acceleration velocity.

10. The detection apparatus of claim 1 wherein the mask apparatus in a position from among the plurality of different positions is structured to at least one of block and absorb at least a portion of the neutron stream.

11. A method of operating the detection apparatus of claim 1 to detect a neutron absorption capability of a control element of a nuclear installation wherein the nuclear installation has a pool of water, the neutron emission source being switchable between an ON state and an OFF state, the neutron emission source in the ON state being in an electrically energized condition structured to generate a neutron stream, the neutron emission source in the OFF state being in an electrically de-energized condition structured to output no meaningful neutron stream, the method comprising:
receiving into the pool of water the neutron emission source in the OFF state;
submerging the neutron emission source the OFF state in the pool of water to a predetermined water depth; and
switching the neutron emission source from the OFF state to the ON state when the depth of the neutron emission source in the pool of water meets or exceeds the predetermined water depth to enable safe operation of the neutron emission source.

12. The method of claim 11, further comprising:
receiving the detector array and the mask apparatus into the pool of water;
receiving at least a portion of the control element generally between the neutron emission source and the detector array, and
monitoring the detector array for the possible outputting therefrom of an output signal that would be representative of an unabsorbed portion the neutron stream passing without being absorbed through the at least portion of the control element.

13. The method of claim 12, further comprising moving at least one of the neutron radiograph apparatus and the control element with respect to the other of the neutron radiograph apparatus and the control element while performing the monitoring.

14. The method of claim 12, further comprising:
receiving, from the detector array an output signal that is representative of an unabsorbed portion the neutron stream passing without being absorbed through the at least portion of the control element, and
responsive to the receiving, reporting a condition of the control element.

15. The method of claim 14 wherein the mask apparatus comprises a mask system having an orifice formed therein, the mask system being structured to resist the passage therethrough of the neutron stream but permitting passage of at least a part of the neutron stream through the orifice, and further comprising:
receiving the output signal when the mask apparatus is in one position removed froth between the neutron emission source and the detector array;
responsive to the receiving, moving the mask apparatus from the one position to a position from among the plurality of positions; and
monitoring the detector array for the possible outputting therefrom of another output signal that would be representative of at least a part of the unabsorbed portion of the neutron stream passing through the orifice.

16. The method of claim 15, further comprising:
moving at least one of the control element and the orifice among a plurality of positions of the orifice with respect to the control element;
detecting a number of instances of the another output signal in at least a subset of the plurality of positions; and
recording a control element inspection elevation, a neutron source strength, a mask configuration, a measured detector array response, and an expected detector array response.

17. The method of claim 16 wherein the orifice has a number of physical dimensions in a number of directions transverse to the part of the neutron stream, and further comprising:
detecting the number of instances of the another output signal when a physical dimension of the number of physical dimensions is of a first size;
changing, the physical dimension from the first size to a second size smaller than the first size;
moving at least one of the control element and the orifice in the second size among a plurality of further positions within the at least subset of the plurality of positions;
detecting a number of further instances of the another output signal in a number of positions from among the plurality of further positions; and
recording, the number of further positions.

18. The method of claim 17, further comprising:
positioning the neutron emission source in the ON state at least a predetermined distance from the detector array; and
employing the water in the pool to slow the neutron stream sufficiently that the unabsorbed portion is detectable by the detector array.

19. The method of claim 17 wherein the mask system comprises a first ask having a first opening formed therein and a second mask having a second opening formed therein, at least one of the first opening and the second opening having a length and a width that are controlled by a robot apparatus, and further comprising:
- manipulating at least one of the first mask and the second mask to overlie at least a portion of at least one of the first opening and the second opening with at least a portion of the other of the first opening and the second opening to form the orifice from the overlying at least portions of the first and second openings;
- moving one of the first mask and the second mask with respect to the other of the first mask and the second mask to at least one of:
  - change the at least one physical dimension between the first size and the second size; and
  - move the position of the orifice with respect to the control element among the plurality of positions.

20. The method of claim 19, further comprising operating the robot apparatus to at least partially receive at least one of the first mask and the second mask between the neutron emission source and the detector array separately from the other of the first mask and the second mask.

\* \* \* \* \*